(12) United States Patent
Mortenson et al.

(10) Patent No.: US 6,609,767 B2
(45) Date of Patent: Aug. 26, 2003

(54) PNEUMATIC CONTROL SYSTEM

(75) Inventors: Dennis L. Mortenson, Anderson, SC (US); Neil E. Russell, Bloomfield Hills, MI (US); Joseph E. Foster, Sterling Heights, MI (US)

(73) Assignee: Ross Operating Valve Company, Troy, MI (US)

( * ) Notice: Subject to any disclaimer, the term of this patent is extended or adjusted under 35 U.S.C. 154(b) by 0 days.

(21) Appl. No.: 09/962,008

(22) Filed: Sep. 24, 2001

(65) Prior Publication Data

US 2003/0057765 A1 Mar. 27, 2003

(51) Int. Cl.[7] .............................................. B60T 13/74
(52) U.S. Cl. ............................... 303/15; 303/86; 303/7; 303/68
(58) Field of Search ........................ 303/15, 3, 7, 118.1, 303/20, 16, 18, 81, 86, 128, 69, 68, 33, 36, 47, DIG. 3; 701/19; 246/167 R

(56) References Cited

U.S. PATENT DOCUMENTS

| | | | |
|---|---|---|---|
| 5,816,132 A | | 10/1998 | Langner et al. |
| 5,918,631 A | | 7/1999 | Weiler et al. |
| 6,024,419 A | * | 2/2000 | Waldrop et al. ............... 303/15 |
| 6,189,980 B1 | | 2/2001 | Kull |
| 6,213,565 B1 | | 4/2001 | Hart |
| 6,217,126 B1 | | 4/2001 | Kull |
| 6,229,452 B1 | | 5/2001 | Kull |
| 6,238,010 B1 | | 5/2001 | Barber et al. |
| 6,249,722 B1 | | 6/2001 | Balukin et al. |

* cited by examiner

*Primary Examiner*—Douglas C. Butler
(74) *Attorney, Agent, or Firm*—Harness, Dickey & Pierce, PLC

(57) ABSTRACT

A pneumatic control system for a freight car having a brake pipe, auxiliary and emergency reservoirs normally charged with pressurized fluid from the brake pipe, a fluid pressure activated brake cylinder device and an exhaust including an electronic controller, at least one pressure sensor, an electrically operated supply valve controlled by the electronic controller selectively communicating the brake cylinder with one of the reservoirs to perform a brake application, an exhaust valve selectively communicating the brake cylinder with the atmosphere thereby performing a brake release function, and an electronically operated exhaust latching valve controlled by the electronic controller to selectively signal the exhaust valve to connect the brake cylinder to the exhaust.

24 Claims, 15 Drawing Sheets

PNEUMATIC CONTROL SYSTEM

BACKGROUND AND SUMMARY OF THE INVENTION

The present invention relates generally to train brakes and, more particular, to a pneumatic control system for use with electronically controlled and non-electronically controlled train brakes.

Traditional train brakes utilize compressed air entering a brake cylinder to actuate each cars brakes. A normally pressurized brake pipe extends the entire length of the train and is used as a control signal such that a reduction in air pressure in the brake pipe causes the brakes to actuate. Each car has a reservoir of compressed air to power the brake cylinders. While the system has satisfactorily functioned in the past, certain deficiencies exist.

Due to the substantial length of many freight trains, the use of pressure drop as an actuation signal sometimes cause undesirable results. Specifically, a substantial amount of time is required for the pressure drop to propagate from car to car. The pressure drop propagation lag causes a corresponding delay in the application of brakes on each subsequent car. Unfortunately, the brake actuation delay increases the train stopping distance.

To avoid the time lag between first signaling for a brake application and when the last brakes apply, each of the car brakes would optimally apply simultaneously to achieve the shortest possible stopping distance. As such, electronically controlled brakes are highly desirable. Unfortunately, the cost of equipping each existing railway car with an electronic brake system is very high. Additionally, implementation of such a change would take years to achieve. It would also be difficult to assure that each and every car was equipped with the proper electronics.

Therefore, it is desirable to produce a pneumatic control system capable of using electronic or brake pipe pressure signals to actuate the brakes of a train car. Such a system is able to take advantage of electronically braked cars while also utilizing a brake pipe pressure drop to actuate the brakes in non-electronically controlled cars.

Accordingly, the pneumatic control system of the present invention operates in at least three separately definable modes. Firstly, the brake control system is operable without the use of electrical power. In this pneumatic mode, the brakes are actuated once a pressure drop in the brake pipe causes motion of certain pneumatic valves. Secondly, the brake control system of the present invention is operable in an electronically controlled pneumatics mode where each brake is operated via an electronic signal. Lastly, the system may operate in an emulation mode. Cars equipped with the pneumatic control system of the present invention operating in emulation mode electronically sense brake pipe pressure. Based on the rate of pressure drop, the brakes are actuated accordingly as will be described in greater detail hereinafter. The pneumatic control system also electronically signals a valve to exhaust the brake pipe on each car so equipped. The further exhaustion of brake pipe assists in sending the brake pipe signal down the train in an expedited manner. Cars in the train that are not equipped with the present invention will be signaled with a brake pipe pressure drop.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
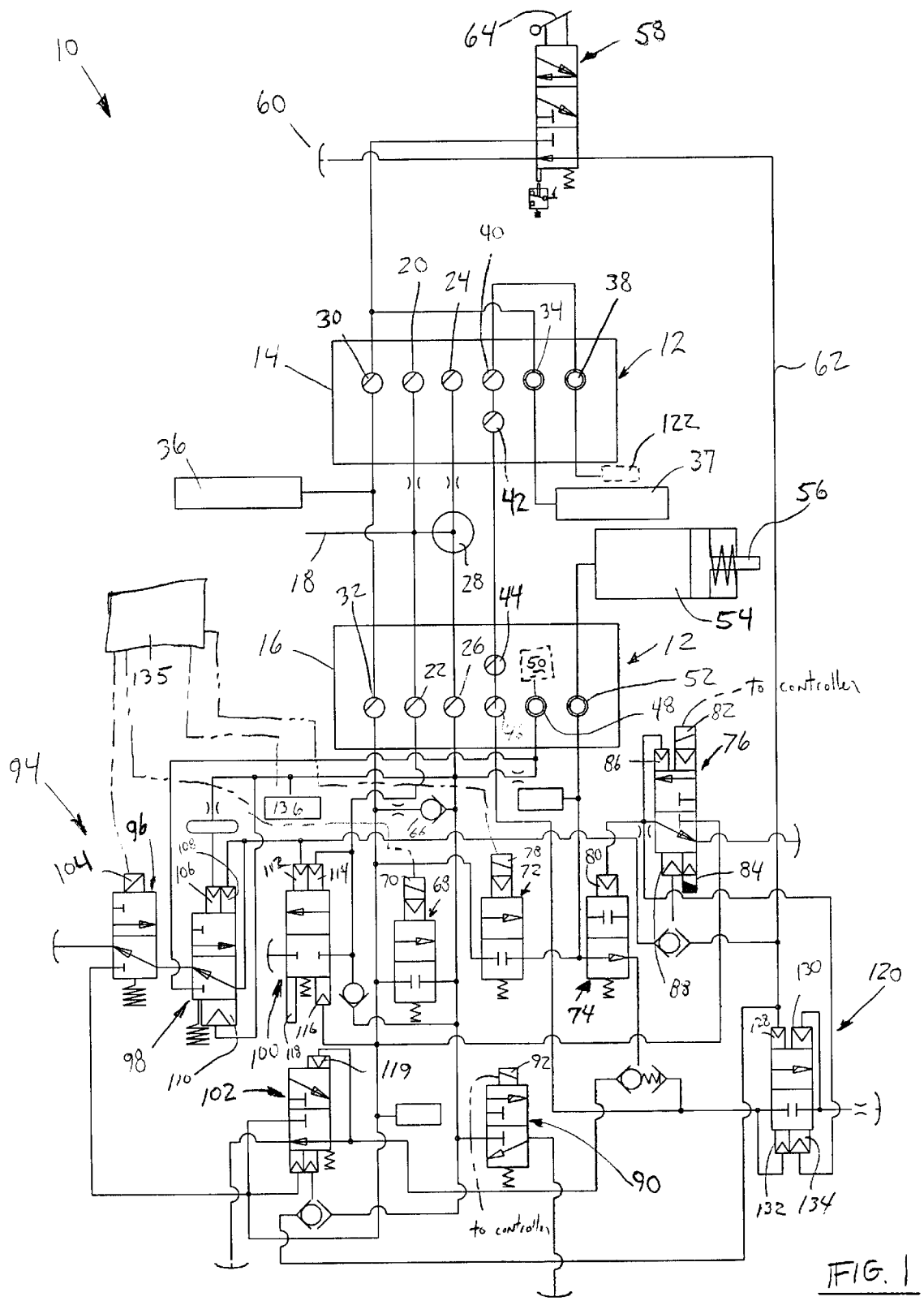
FIG. 1 is a schematic of a pneumatic control system constructed in accordance with the teachings of the present invention.

With reference to FIG. 1, a pneumatic control system constructed in accordance with the teachings of the present invention is generally identified at reference numeral 10. Pneumatic control system 10 is depicted in schematic form using standardized pneumatic and fluid system symbols. It should be appreciated that each car of a freight train is preferably equipped with similar pneumatic control systems 10. Accordingly, only one pneumatic control system 10 will be described in detail.

Pneumatic control system 10 includes a block manifold 12 having a service side 14 and an emergency side 16. Pressurized air is supplied from a brake pipe 18 which extends substantially along the entire length of the train. Brake pipe 18 is plumbed to a brake pipe port 20 on service side 14 and a port 22 on the emergency side. Brake pipe 18 is also coupled to ports 24 and 26 via a filter 28.

Pneumatic control system 10 functions to provide service brake applications and emergency brake applications via electronic input or pneumatic input as previously described. Accordingly, pneumatic system 10 may function in a purely electronic mode, a purely pneumatic mode, or an emulation mode. In the mixed or emulation mode, some cars are equipped with fully electronic braking control systems while others are not.

Block manifold 12 also includes reservoir ports 30, 32 and 34 in fluid communication with an emergency reservoir 36 and an auxiliary reservoir 37. An exhaust port 38 is also provided on the service side. Ports 40, 42, 44 and 46 are also plumbed in communication with exhaust port 38. A quick action chamber port 48 is in communication with a quick action chamber 50. Quick action chamber 50 is preferably sized to store 150 to 175 cubic inches of air. A brake chamber port 52 is in communication with a brake chamber 54. Brake chamber 54 converts the pressure supplied therein to a linear force acting upon a push rod 56. Push rod 56 in turn actuates the car brakes.

A manual vent valve 58 is plumbed in communication with an exhaust port 60 and reservoir port 30. The opposite side of manual vent valve 58 communicates with a plurality of valves via a line 62 as will be described in greater detail hereinafter. Manual vent valve 58 is a three position directional control valve which is spring biased in the up position as shown in FIG. 1. Manual vent valve 58 includes a lever 64 selectively operable to reposition the valve to one of the two other positions shown.

A variety of sensors and valves comprise the remaining portion of pneumatic control system 10. For clarity, each component will be initially introduced and subsequently described. A check and orifice valve 66 is plumbed between the brake pipe and the reservoirs to control the rate at which each car reservoir fills. Check and orifice valve 66 assures that the cars along the entire length of the train pressurize at approximately the same time. Under certain conditions, this also assures that the brakes are released at approximately the same time.

Pneumatic control system 10 also includes a quick release valve 68. Quick release valve 68 is a two position directional control valve that includes a spring biasing the valve to the position shown in FIG. 1. Quick release valve 68 also includes an electrical solenoid 70 that is selectively energized to bypass check and orifice valve 66. Therefore, quick release valve 68 provides a method of quickly filling the brake pipe of the car.

A supply valve 72, an exhaust valve 74 and an exhaust latching valve 76 comprise the requisite valves for conducting a service brake application. Supply valve 72 is a two-way, two position directional control valve spring biased in the up position as shown in FIG. 1. Supply valve 72 also includes an electrical solenoid 78 which may be selectively energized to move supply valve 72 to the down position. Exhaust valve 74 is also a two-way, two position directional control valve having a spring bias. Exhaust valve 74 includes a pneumatic pilot 80. Upon receipt of a pressure signal to pilot 80, exhaust valve 74 shifts to the blocked, down position. Exhaust latching valve 76 is a three-way, two position directional control valve having an upper solenoid 82 and a lower solenoid 84. Each of the solenoids may be selectively energized to displace the valve. In addition, exhaust latching valve 76 includes an upper pilot 86 and a lower pilot 88. It should be appreciated that lower pilot 88 acts upon a larger piston diameter than upper pilot 86. Accordingly, if both upper and lower pilots receive equal pressure signals, pilot 88 will cause exhaust latching valve 76 to move to the up position as shown in FIG. 1.

Pneumatic control system 10 also includes a quick service valve 90 in communication with the filtered brake pipe. Quick service valve 90 is a two position directional control valve that is spring biased to the position shown in FIG. 1. Quick service valve 90 includes an electrical solenoid 92 which is selectively energizable to move it to the down position.

Figure 7:
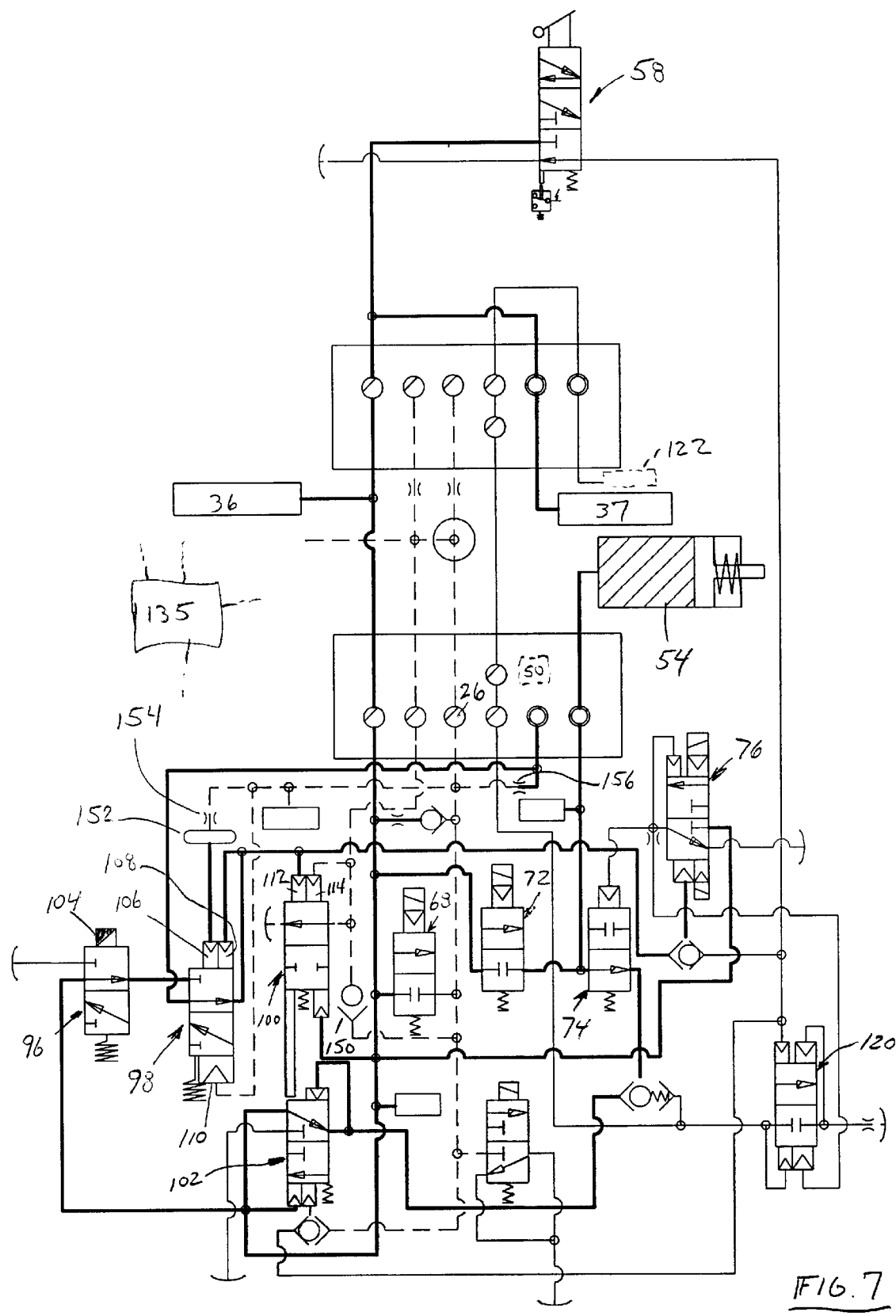
FIG. 7 is a third-time segment of the aforementioned emergency train stop.

An emergency valve assembly 94 is represented by four separate valves schematically. One skilled in the art will appreciate that a variety of physical valve constructions may exist to achieve the functions schematically depicted. Therefore, valve variants which include different combinations of the valves schematically depicted in one or more housings are contemplated as being within the scope of the present invention. For example, emergency valve assembly 94 includes an emergency backup pilot valve 96, a pressure sensing valve 98, a first emergency backup valve 100 and a second emergency backup valve 102 physically mounted within a single housing. Valve 96 is a three-way, two position directional control valve which is spring biased in the up position. Valve 96 also includes an electrical solenoid 104 which is selectively energizable to move valve 96 to the down position. Valve 98 is also a three-way, two position directional control valve which is spring biased in the up position. Valve 98 includes a pair of upper pilots 106 and 108 as well as a lower pilot 110. Lower pilot 110 acts upon a piston diameter equal to pilot 106. Accordingly, if a greater pressure signal is present at pilot 106, sufficient to overcome the combined force of lower pilot 110 and the lower spring, valve 98 will move to the down position as shown in FIG. 7.

Valve 100 is a two-way, two position directional control valve which is spring biased to the up position as shown in the figure. Valve 100 includes a pair of upper pilots 112 and 114 along with a lower pilot 116. Pilots 112 and 114 act upon a diameter greater than pilot 116. As such, valve 100 shifts to the down position if a signal is placed upon pilot 112 and 114 regardless of the presence of a signal upon pilot 116. Valve 100 also includes a mechanical push rod 118. Valve 100 includes a push rod 118 mechanically engagable with valve 102 such that when valve 100 is in the down position valve 102 is in the down position as well. If valve 100 were subsequently switched to the up position, valve 102 would not necessarily follow because push rod 118 is not coupled to valve 102.

Valve 102 is a three-way, two position directional control valve that is spring biased in the up position. Valve 102 includes an upper pilot 119 and two lower pilots. The pilot valves are sized such that a signal upon either lower pilot causes valve 102 to be in the up position regardless of the presence of a signal upon pilot 119.

A brake cylinder dump valve 120 is plumbed in communication with manual vent valve 58 and brake cylinder 54. Brake cylinder dump valve 120 is required because a number of trains are equipped with a retainer valve 122 in line with the exhaust of the brake cylinder. Retainer valve 122 supplies a restriction to the exhaust of brake cylinder 54. The restriction is used to maintain a brake application for a desired length of time. However, retainer valve 122 maintains the pressure in the range of 10 to 22 P.S.I. within the system. In order to completely evacuate brake cylinder 54, brake cylinder dump valve 120 is plumbed as shown. Brake cylinder dump valve 120 is a two-way directional control valve having a pair of upper pilots 128 and 130 along with a pair of lower pilots 132 and 134.

Figure 2:
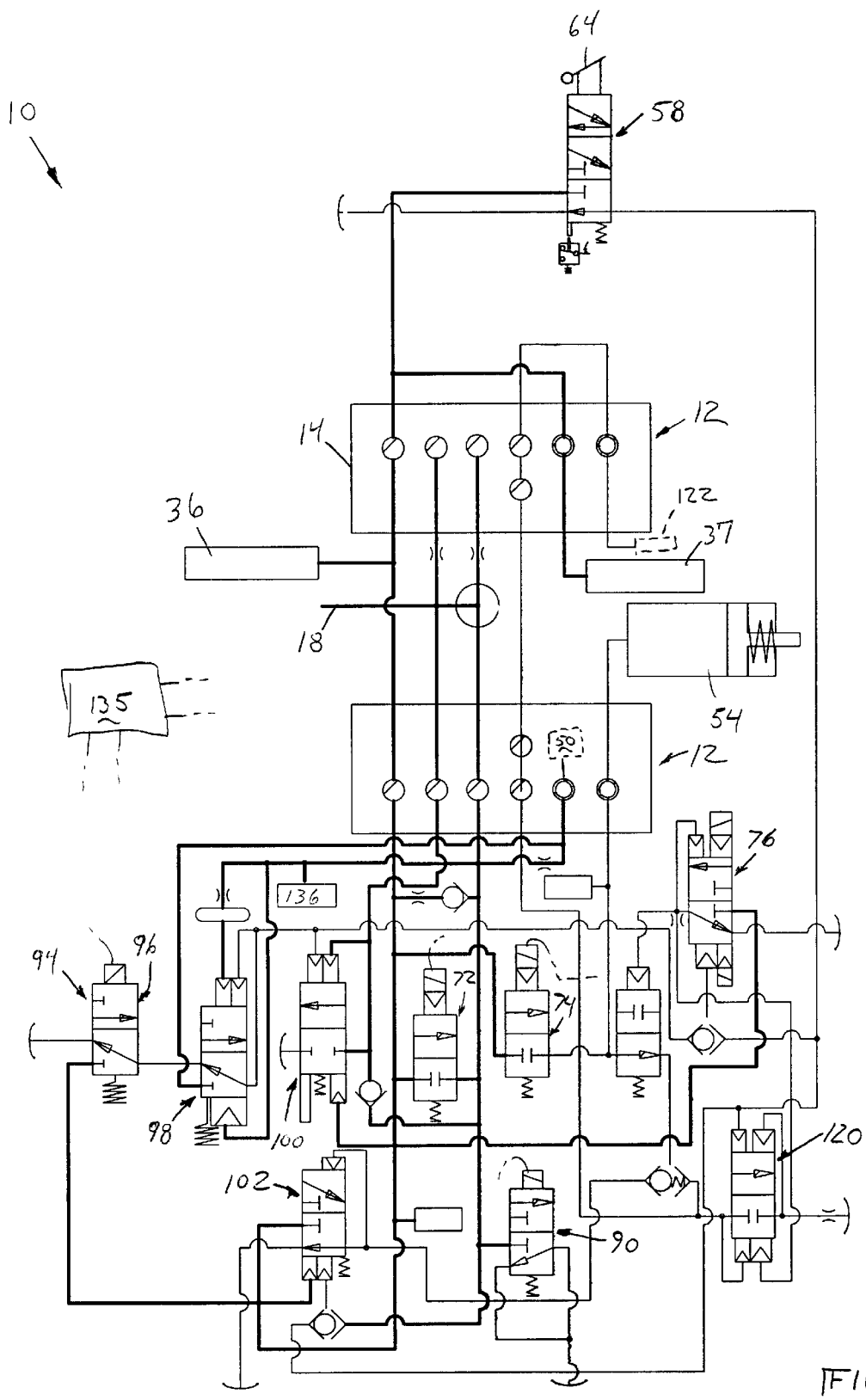
FIG. 2 is a schematic depicting the pneumatic control system in the present invention in a pressurized condition.

With reference to FIG. 2, pneumatic control system 10 has been pressurized by providing a supply of pressurized air at the inlet or brake pipe 18. It should be appreciated that at this time emergency reservoir 36, auxiliary reservoir 37 and quick action chamber 50 are pressurized as well. High pressure within a given line is indicated by a bold line. Low pressure is indicated by a dashed line. An evacuated line is depicted by a solid line of standard weight. Typically, pneumatic control system 10 is pressurized to approximately 90 P.S.I. when fully charged.

Figure 3:
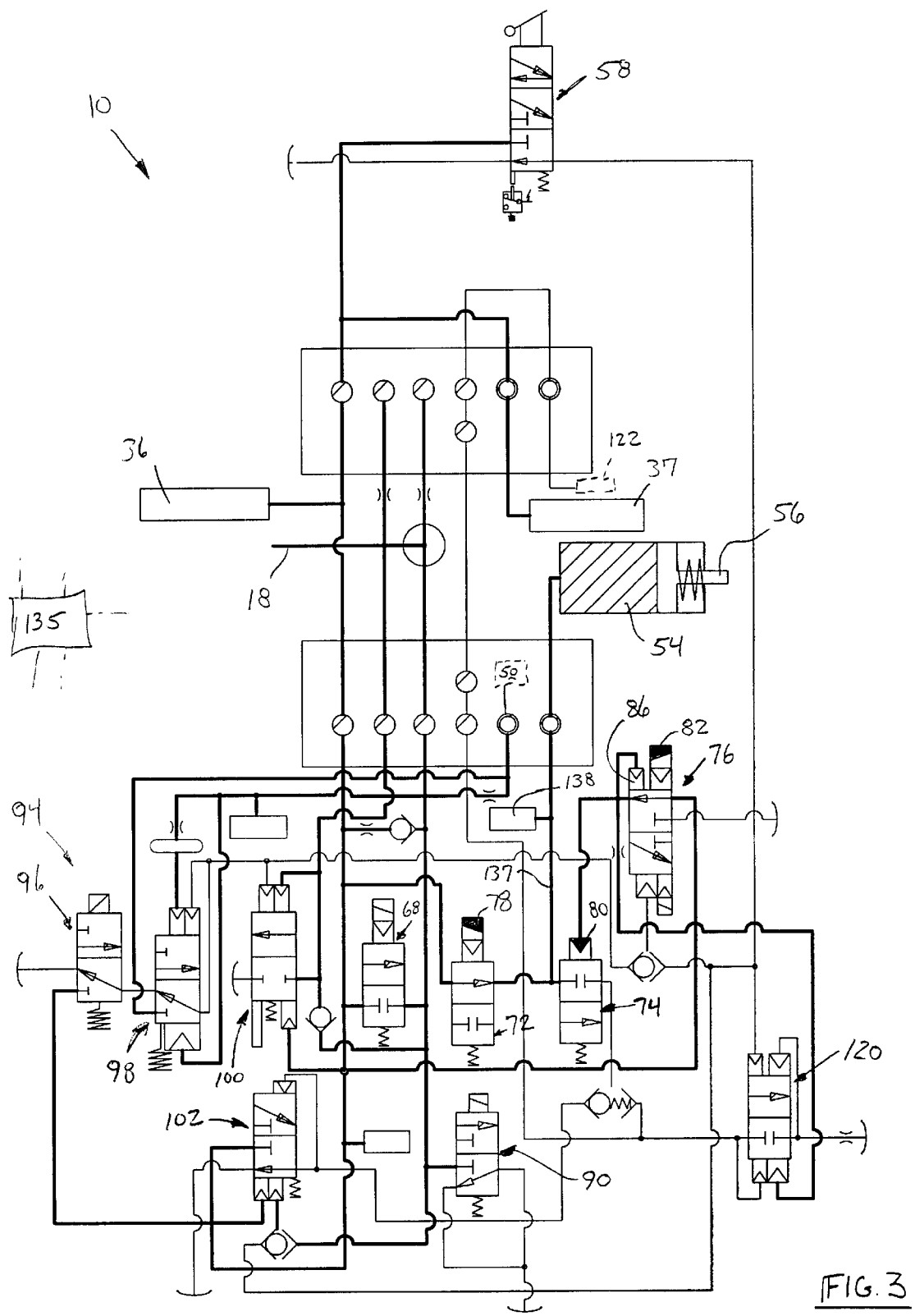
FIG. 3 is a schematic depicting a service brake application.
Figure 4:
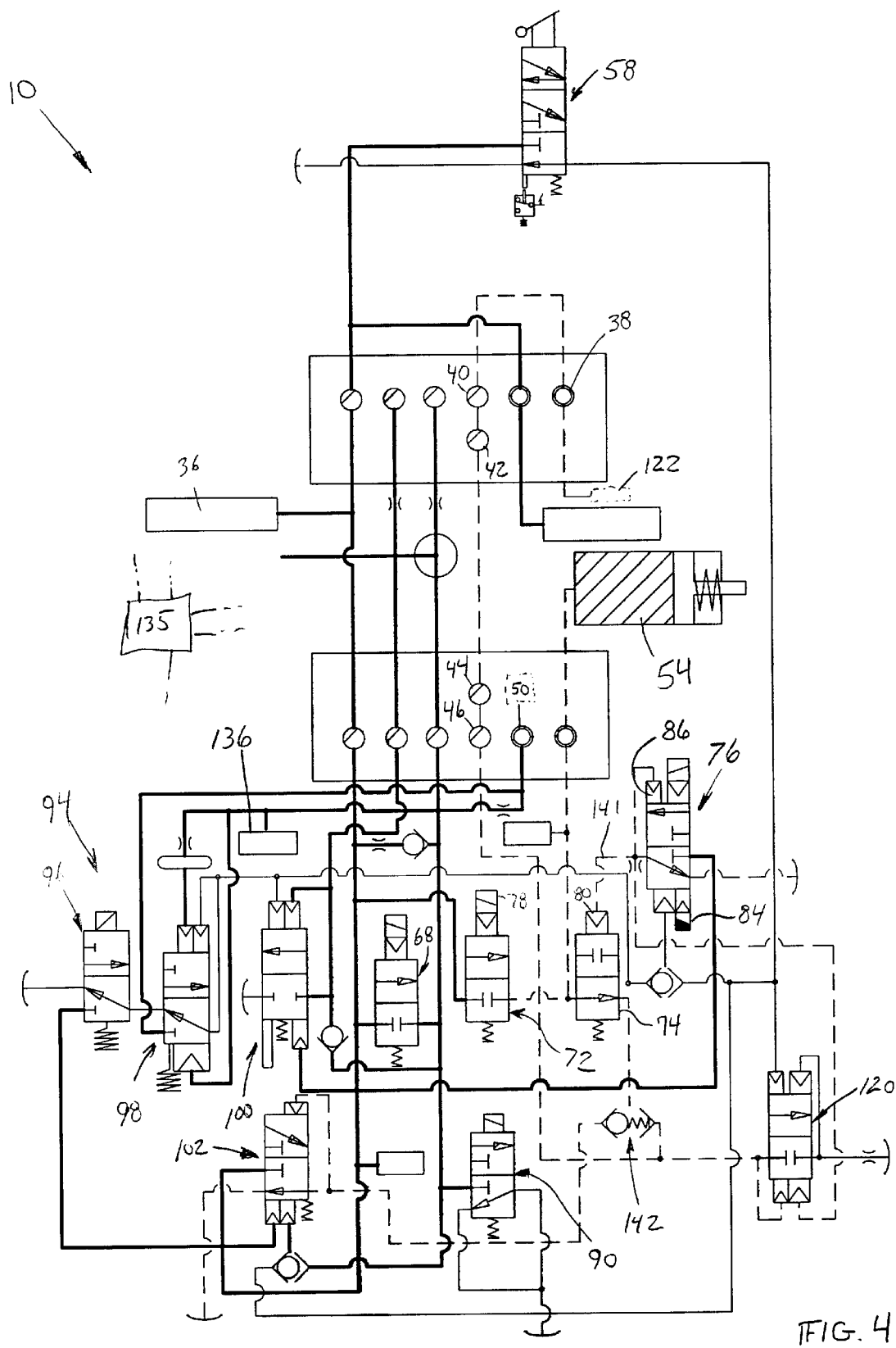
FIG. 4 is a schematic depicting service brake release.
Figure 5:
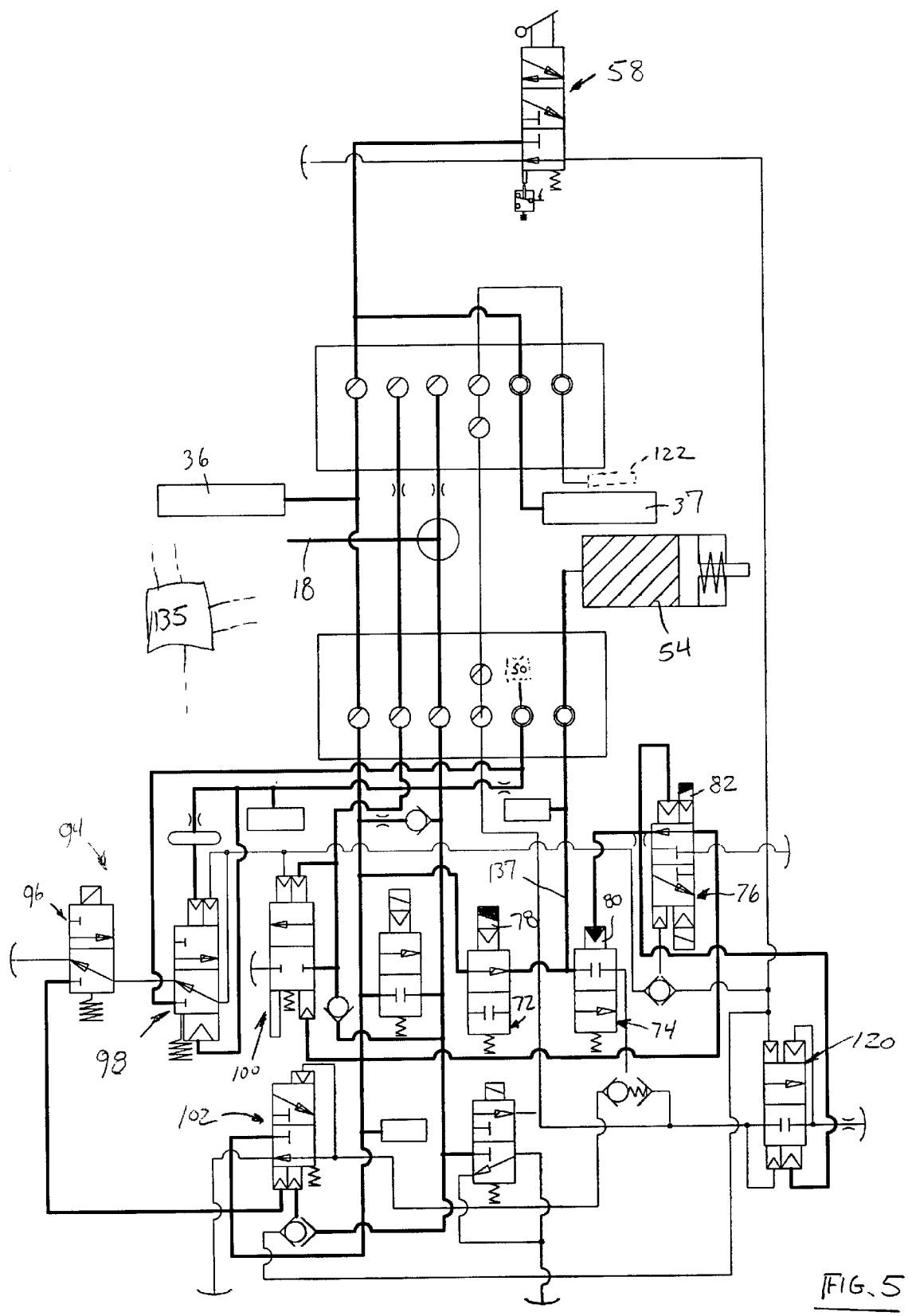
FIG. 5 is a schematic depicting a first-time segment of an emergency train stop in accordance with the teachings of the present invention.

An electronic controller 135 is coupled in electrical communication with each of the solenoids and pressure sensors described. An electronic controller 135 is mounted to each car equipped with the present invention. With reference to FIGS. 3 and 4, a service brake application and a service brake release are depicted. During a service brake application, pressure from reservoirs 36 and 37 is supplied to brake cylinder 54. Entry of pressurized fluid within brake cylinder 54 causes push rod 56 to axially displace and actuate the car brakes. To initiate a service brake application, a brake pipe pressure drop is generated by the engineer at the locomotive. The brake pipe pressure is sensed by a pressure sensor 136. Electronic controller 135 then electrically energizes solenoid 82 of exhaust latching valve 76 thereby causing the valve to move to the down position as shown in FIG. 3. By switching exhaust latching valve 76 to the down position, pilot 80 of exhaust valve 74 is signaled. Upon receipt of the pilot signal, exhaust valve 74 shifts to the closed position. Once exhaust latching valve 76 shifts down, a signal is sent to pilot 86. Therefore, exhaust latching valve 76 "latches" in the down position without the need for electrical energy to solenoid 82. Another electrical signal is sent to solenoid 78 of supply valve 72. Supply valve 72 shifts to the down position thereby providing a pathway for pressurized fluid to enter a line 137 and fill brake cylinder 54. A pressure sensor 138 is coupled to line 137 to provide brake cylinder pressure data to electronic controller 135 if the train is so equipped.

With reference to FIG. 4, the service brakes are released by de-energizing solenoid 78 of supply valve 72. Because supply valve 72 has a spring bias, the valve shifts to the closed, up position once solenoid 78 is no longer actuated. Also, an electrical signal is sent to lower solenoid 84 of exhaust latching valve 76 to shift the valve to the up position. Because of the exhaust latching valve shift, a line 141 coupled to pilot 80 is exhausted. Once the signal to pilot 80 has been removed, exhaust valve 74 returns to its spring biased up position. At this time, pressurized air from brake cylinder 54 travels through exhaust valve 74 and a shuttle valve 142 up through ports 46, 44, 42 and 40 to finally arrive at exhaust port 38. Pressurized fluid vents to atmosphere at retainer valve 122.

FIGS. 5–9 depict valve states and line pressure conditions corresponding to an emergency train stop. The figures correspond to an emergency train stop in emulation mode where an electronic controller senses a rapid decrease in brake pipe pressure. Specifically, cars connected to an electrical supply are signaled to energize a predetermined set of valve solenoids to begin an emergency stop. Pneumatic control system 10 also functions to propagate the pneumatic signal to cars not equipped with the present invention by rapidly dropping the brake pipe pressure in each car equipped with the present invention.

To initiate the emergency train stop, solenoid 82 of exhaust latching valve 76 is electrically energized. Exhaust latching valve 76 shifts to the down position to provide pilot 80 of exhaust valve 74 with a signal. Exhaust valve 74 shifts to the down position to close the pathway to exhaust. Pressure is supplied to pilot 86 on the top of exhaust latching valve 76 to "latch" valve 76 in the down position without the presence of an electrical signal to solenoid 82. To conserve energy, the signal to solenoid 82 is applied only momentarily. Additionally, solenoid 78 of supply valve 72 is electrically energized. Upon energization, supply valve 72 shifts to the down position to pressurize line 137 and brake cylinder 54. One skilled in the art will appreciate that the time required to actuate the brakes in the aforementioned emergency situation is minimal due to the use of solenoids 78 and 82. At this time, it is desirable to exhaust the brake pipe on each car equipped with electricity to signal cars which are currently operating in pneumatic mode only.

Figure 6:
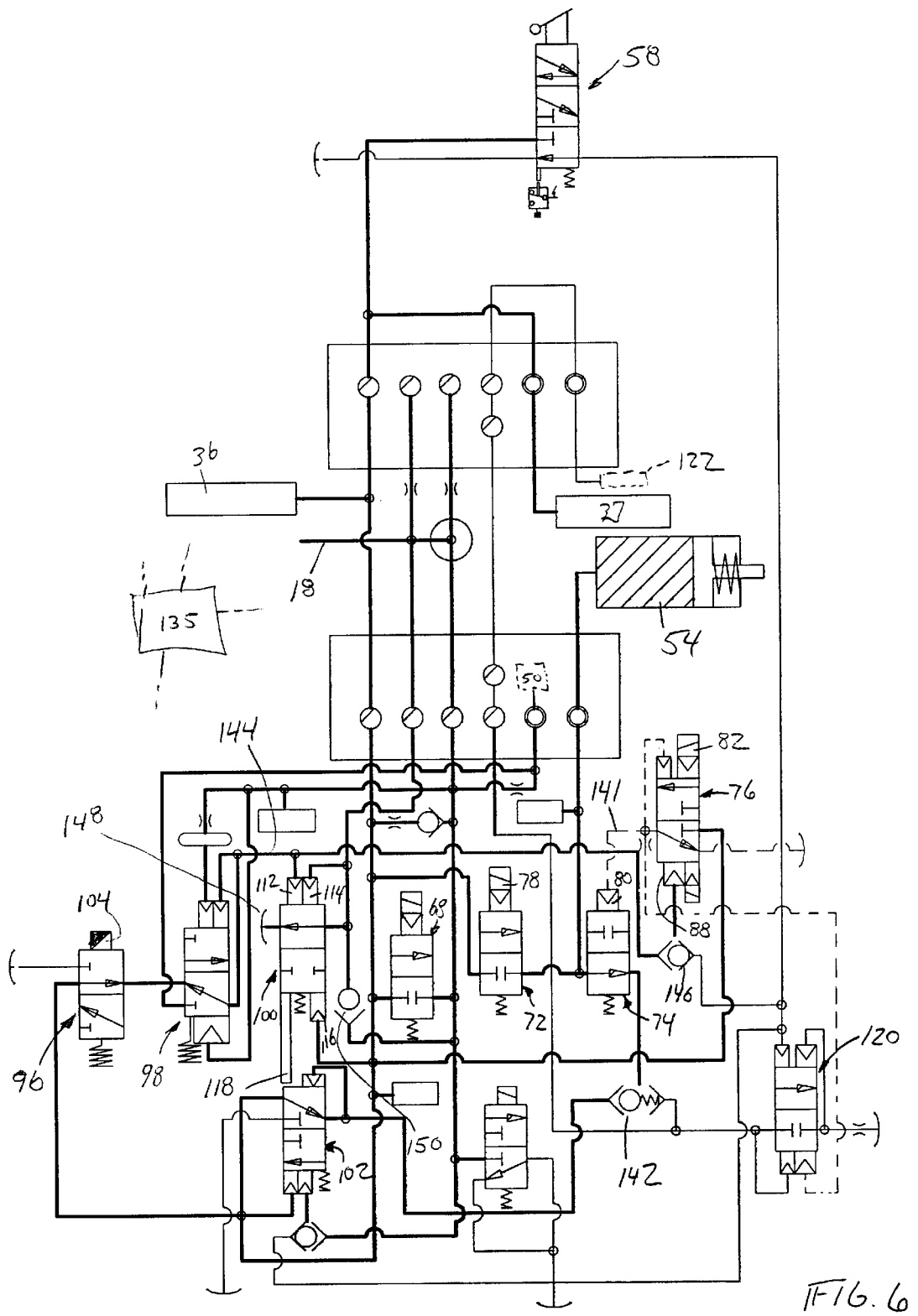
FIG. 6 is a schematic of a second-time segment of the emergency train stop of FIG. 5.

FIG. 6 represents the next state of pneumatic control system 10 to further continue the emergency train stop and exhaust brake pipe 18. Electrical solenoids 78 and 82 are de-energized. Due to the spring bias within supply valve 72, the valve resets to the up position once solenoid 78 is de-energized. To reset exhaust latching valve 76, an electrical signal is sent to energize solenoid 104 of valve 96. Valve 96 shifts to the down position allowing pressurized fluid to pass through valve 98 and pressurize a line 144. Pressurized fluid from line 144 passes through a shuttle valve 146 and provides a signal to pilot 88 on the lower side of exhaust latching valve 76. As such, exhaust latching valve 76 is reset in the up position. Once exhaust latching valve 76 is reset, pressure in line 141 that was previously acting upon pilot 80 is exhausted. As a result, exhaust valve 74 shifts to the spring biased up position shown in FIG. 6.

Additionally, because line 144 has been pressurized, a signal is sent to pilot 112. As discussed earlier, valve 100 is constructed such that the valve shifts to the down position if both pilots 112 and 114 are energized regardless of the presence of a signal on pilot 116. Thus, brake pipe 18 is exhausted to atmosphere at vent 148. As valve 100 is shifted to the down position, push rod 118 mechanically shifts valve 102 to the down position. When valve 102 is in the down position, pressurized air from reservoir 36 passes through valve 102, shuttle valve 142 and exhaust valve 74 to further pressurize brake cylinder 54. Further pressurization of brake cylinder 54 is required because train brake cylinders typically leak. Even though the brake should theoretically maintain actuation once the pressurized air is trapped within the brake cylinder, the actual brake force decreases unless pressure is continuously supplied.

FIG. 7 depicts the further decay of brake pipe pressure through valve 100. A water expulsion valve 150 is plumbed in communication with filtered brake pipe port 26 and located at an elevational low point to provide a purge point for any water trapped in the line. During the filtered brake pipe exhaust, the signal on pilot 110 is depleted. An accumulator 152 is plumbed in combination with an orifice 154 to maintain a signal on pilot 106 during venting of the brake pipe. Based on these signal conditions, valve 98 shifts to the down position and orifice 156 limits the depletion of quick action chamber 50 to maintain the signal at pilot 108 for a desired period of time. Accordingly, the quick acting chamber acts as a timing mechanism that holds valve 98 off it's seat until quick action chamber 50 is depleted. Similarly, pilot 112 of valve 100 is signaled with pressurized air until brake pipe 18 and quick action chamber are fully exhausted.

Figure 8:
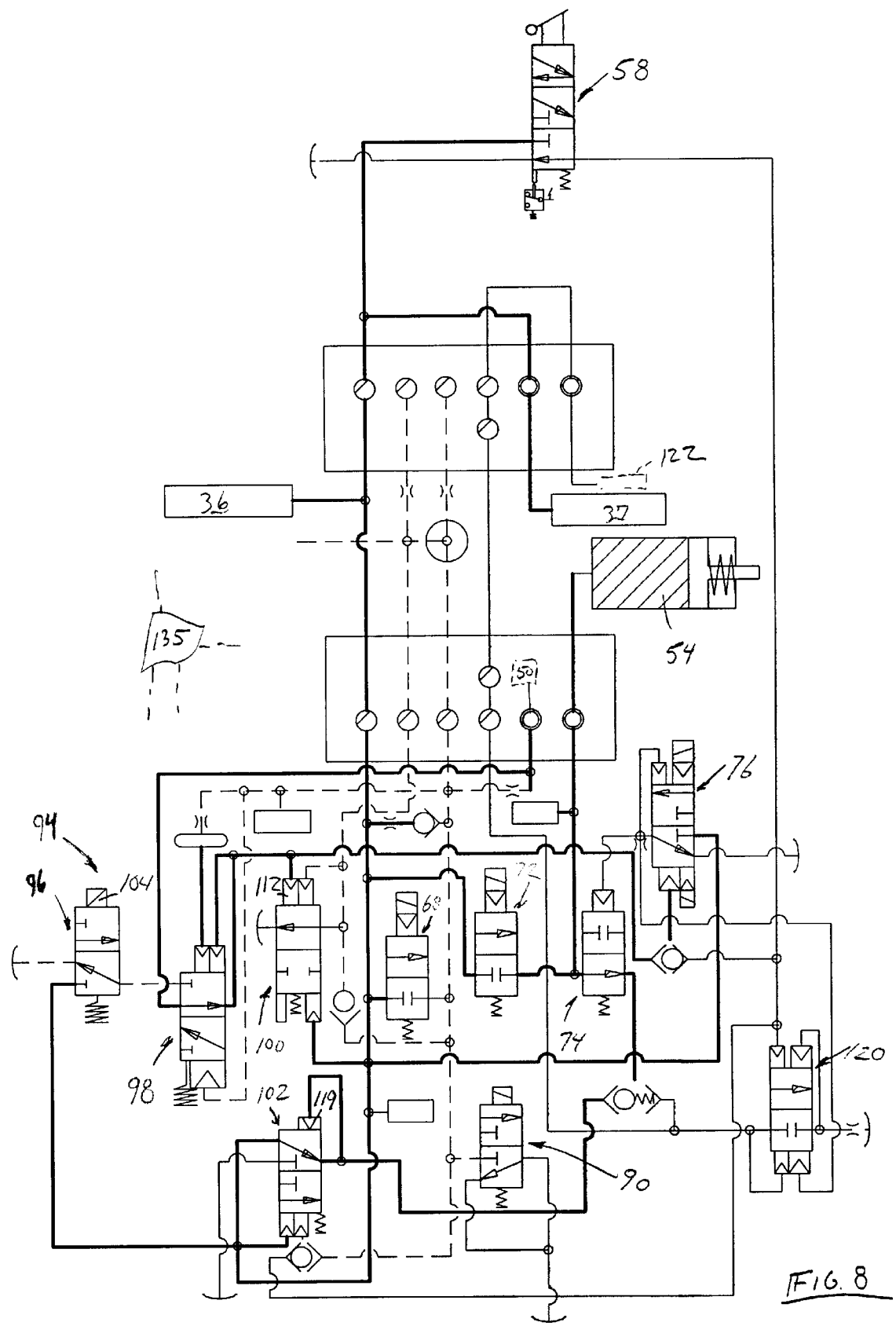
FIG. 8 is a fourth-time segment of the emergency train stop.

With reference to FIG. 8, solenoid 104 is deactivated. It is important to note that reservoir pressure continues to supply brake cylinder 54 and brake pipe pressure continues to be exhausted after solenoid 104 is de-energized. Valve 96 provides an excellent example of how power is conserved during operation of pneumatic control system 10. Specifically, an electrical signal of very short duration is all that is required for solenoid 104 to shift valve 96 and begin exhausting the brake pipe. Once valve 100 has been shifted, pilot 112 maintains the proper position of valve 100. As such, solenoid 104 may be deactivated to conserve energy.

Figure 9:
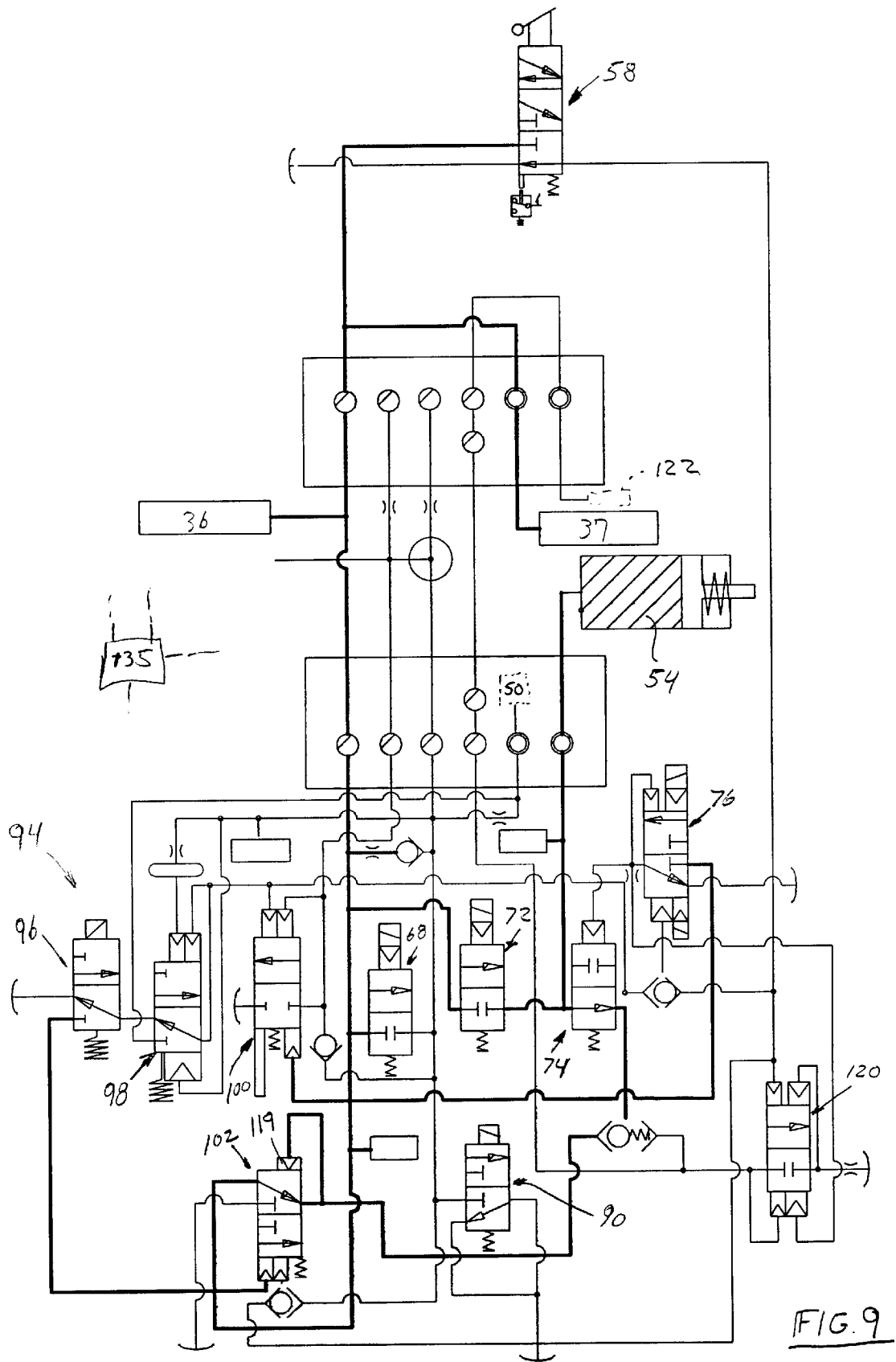
FIG. 9 is a fifth and final segment of the emergency train stop condition.

FIG. 9 represents the last state diagram corresponding to an emergency train stop. At this time, the brake pipe, filtered brake pipe and quick action chamber have been completely exhausted. Valve 98 returns to the spring biased up position. Valve 100 also returns to the spring biased up position. Once valve 100 resets, the exhaust path of brake pipe 18 is closed. Valve 102 does not automatically reset upon movement of valve 100 but stays in the down position based on the signal to pilot 119. As described earlier, valve 102 remains in this position to maintain the supply of pressurized fluid to brake cylinder 54. Therefore, the brakes will remain actuated until the reservoirs are completely depleted due to cylinder leakage or intervention of another signal from the train operator.

Figure 10:
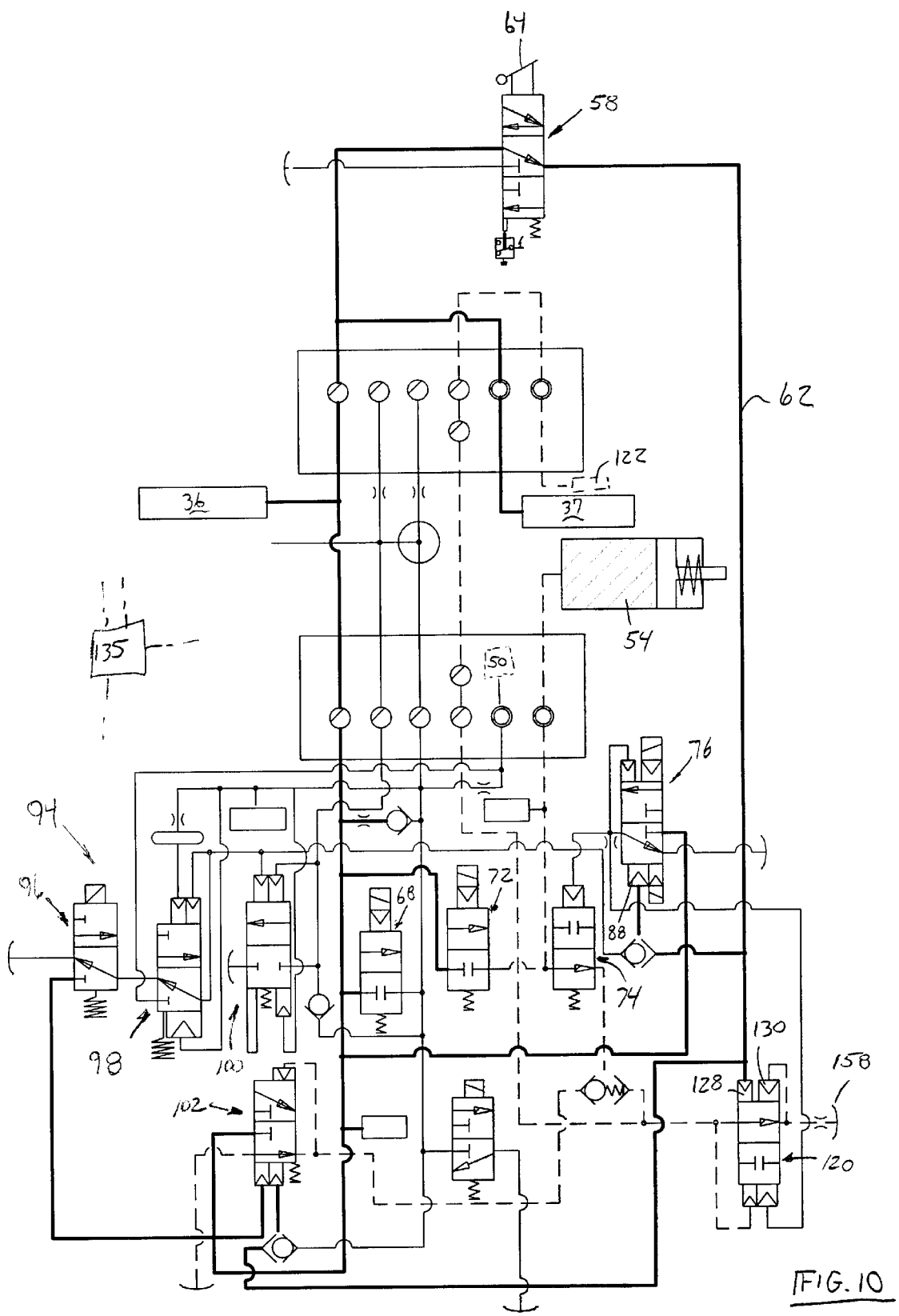
FIG. 10 is a schematic of the pneumatic control system of the present invention depicting the valve positions and flow paths corresponding to a manual vent valve in a second position.

For example, if the operator wishes to manually release the brakes after an emergency stop, manual vent valve 58 may be actuated. With reference to FIG. 10, manual vent valve 58 is deployed in its second or middle position by pulling and holding lever 64. Once in the second position, manual vent valve 58 supplies pressure to line 62 to reset valves 76 and 102 and to open valve 120. To shift valve 120 to its reset or down position, pilot 128 is signaled. Similarly, the lower pilot of valve 102 and pilot 88 of valve 76 are also signaled. It should be appreciated that valve 120 is incorporated within pneumatic control system 10 because some trains are equipped with retainer valves while others are not. If the train is equipped with a retainer valve, a residual amount of pressure is maintained within brake cylinder 54 and the brakes are not fully released. Valve 120 is plumbed directly to an exhaust port 158 thereby allowing the pressure to completely dissipate.

Figure 11:
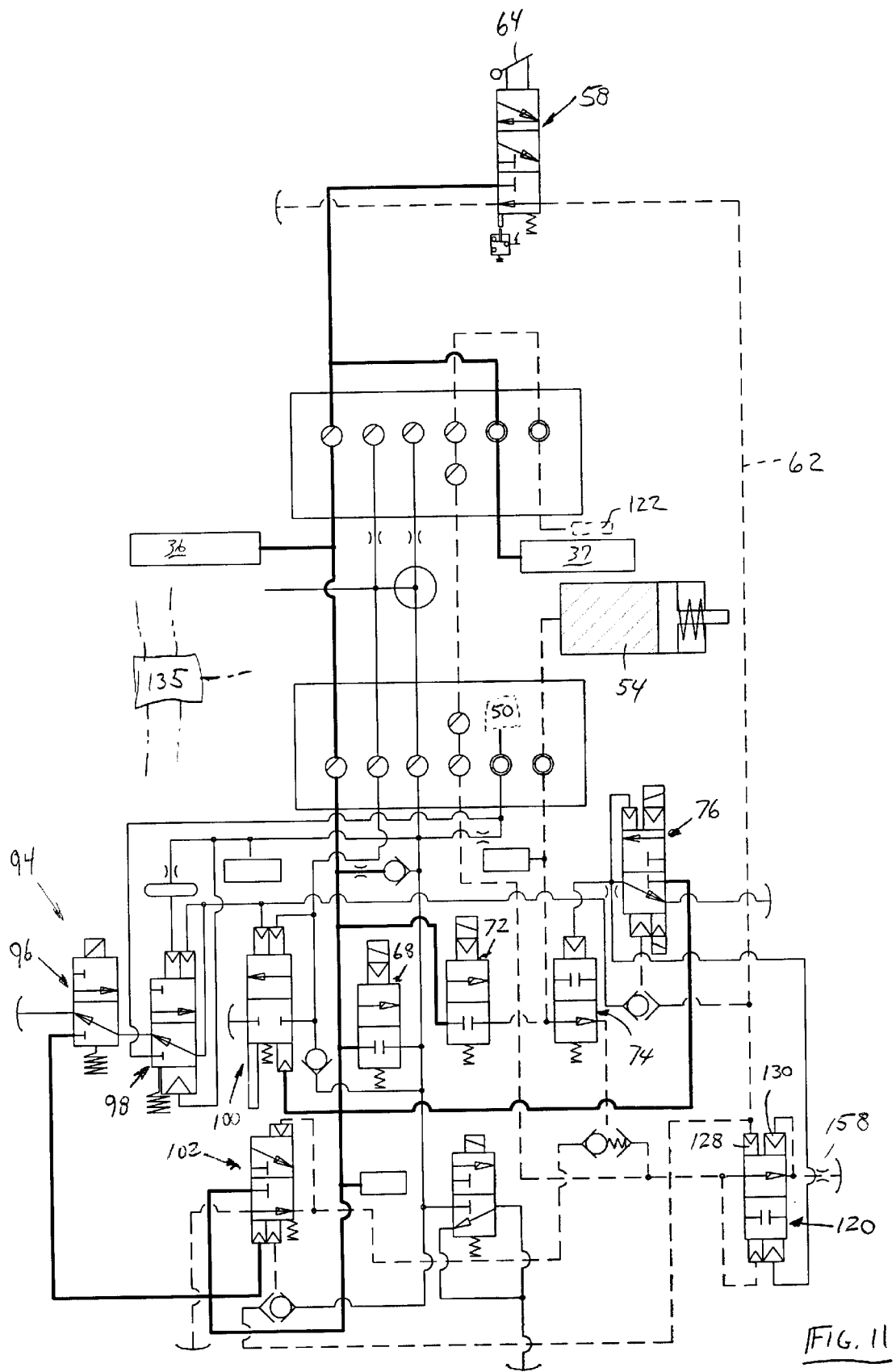
FIG. 11 is a schematic showing the manual vent valve after it has been released from the second position as in FIG. 10, but at a later time.

FIG. 11 depicts the state of pneumatic control system 10 after lever 64 of manual vent valve 58 has been released to allow the valve to return to its spring biased first position. The pilot signal which was previously introduced to line 62 is now exhausted to atmosphere.

Figure 12:
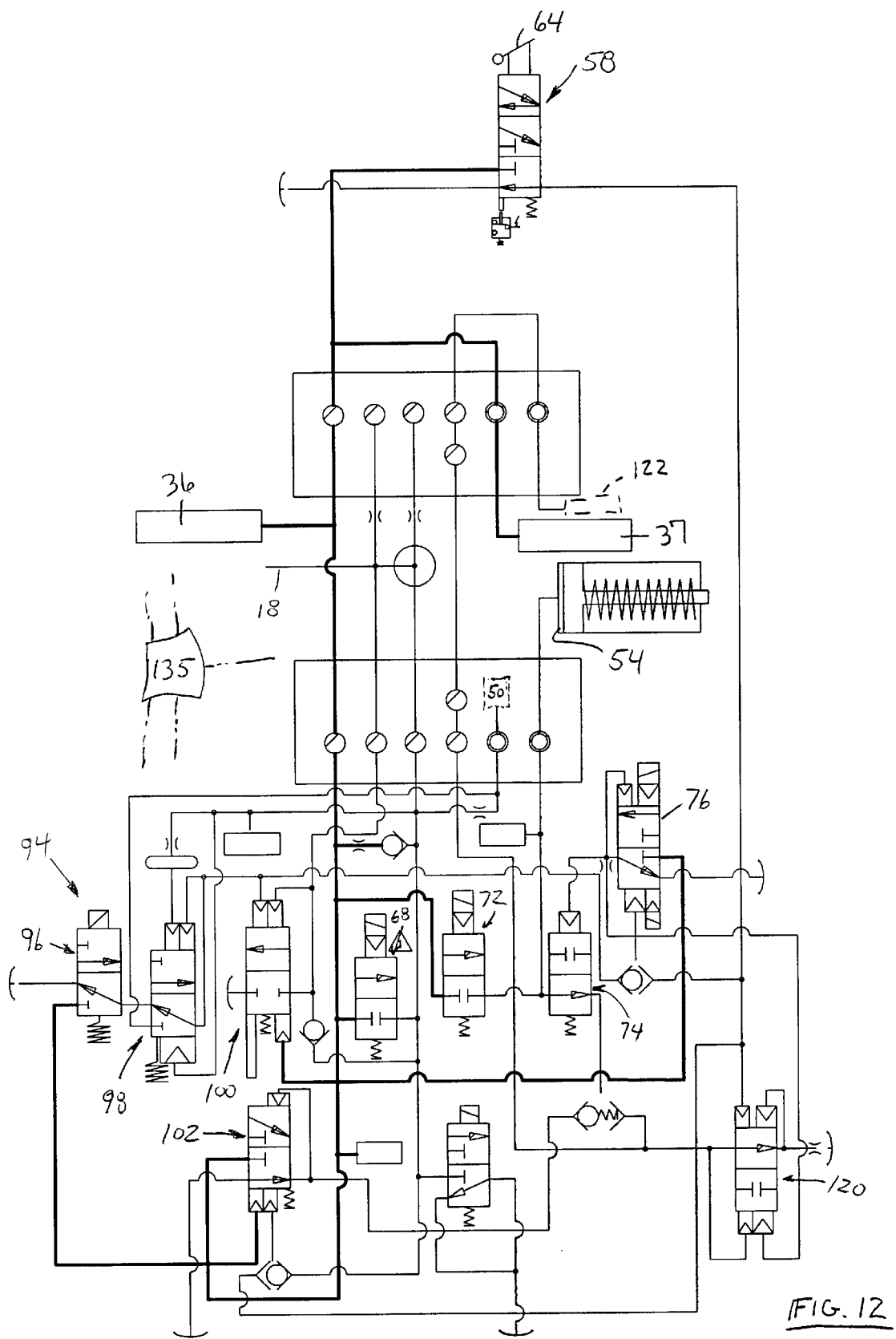
FIG. 12 is yet another schematic depicting the manual vent valve after it has been released from the second position at a time after FIGS. 10 and 11.

FIG. 12 depicts pneumatic control system 10 in a state where the brake cylinder 54 has been completely evacuated. The only remaining pressure within the system is stored in emergency reservoir 36, auxiliary reservoir 37 and the associated lines. The condition depicted is known as the brakes off mode of the train.

Figure 13:
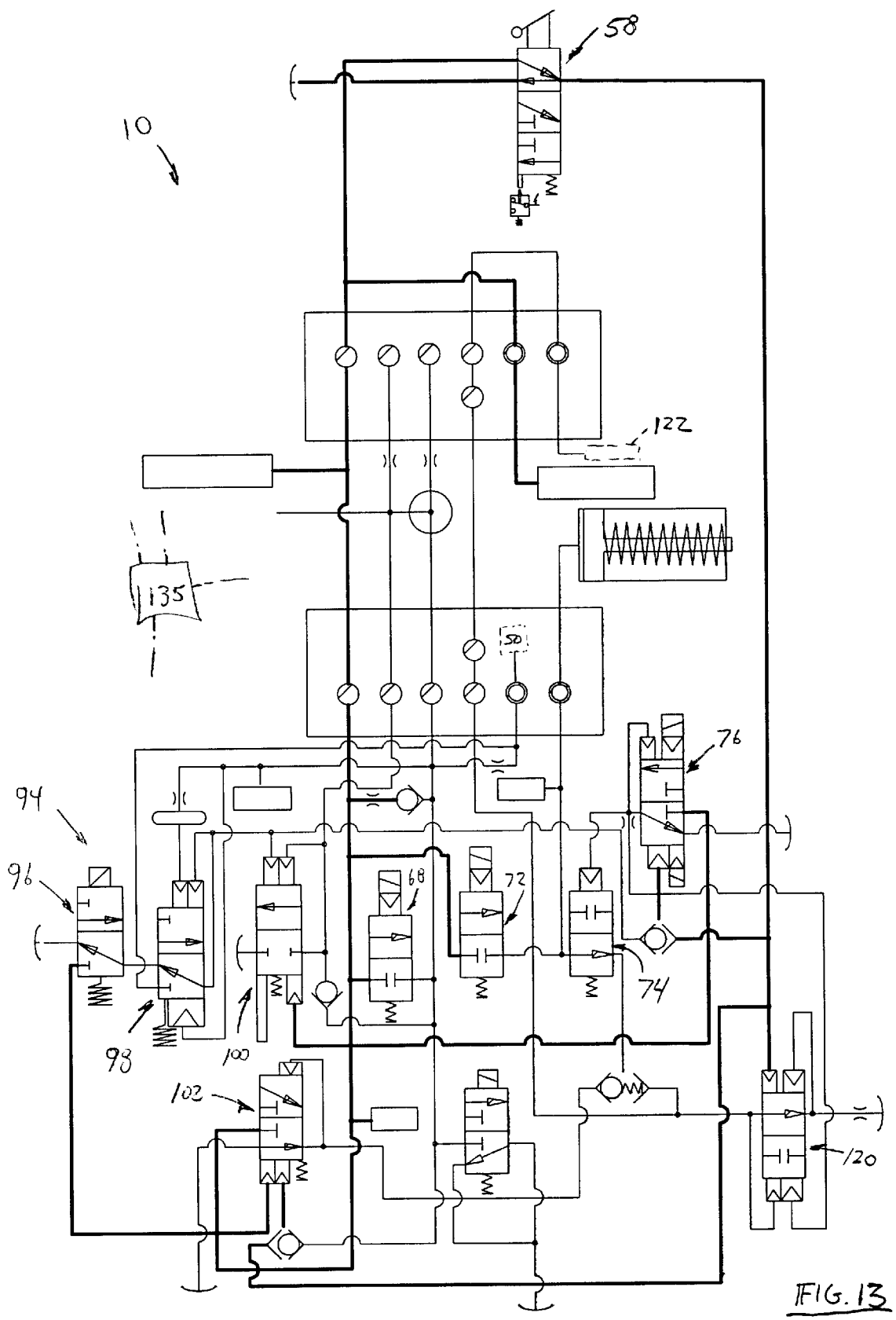
FIG. 13 is a schematic depicting the manual vent valve in a third position.
Figure 14:
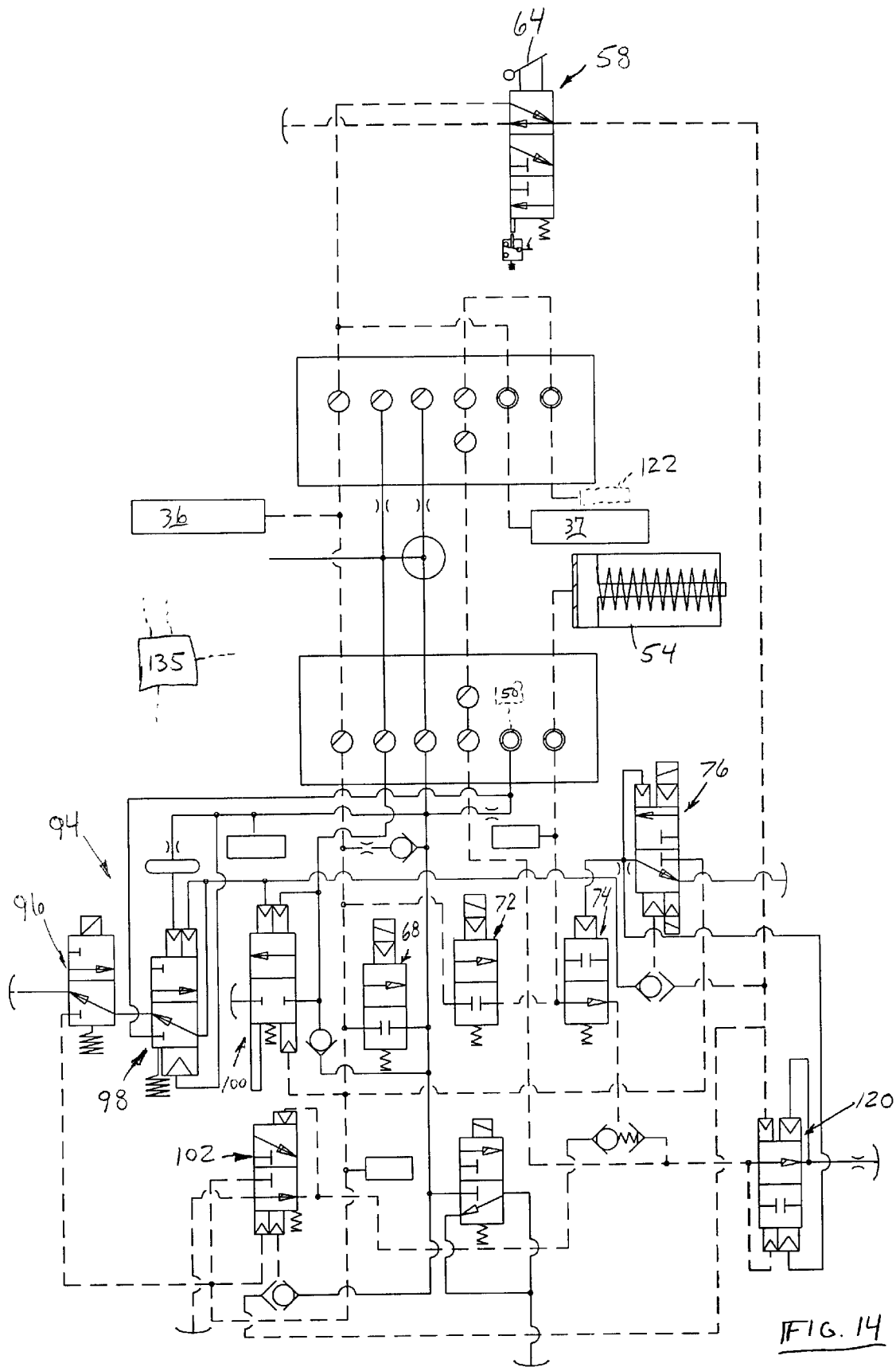
FIG. 14 is a schematic showing the exhausting of the reservoir while the manual vent valve is in the third position.
Figure 15:
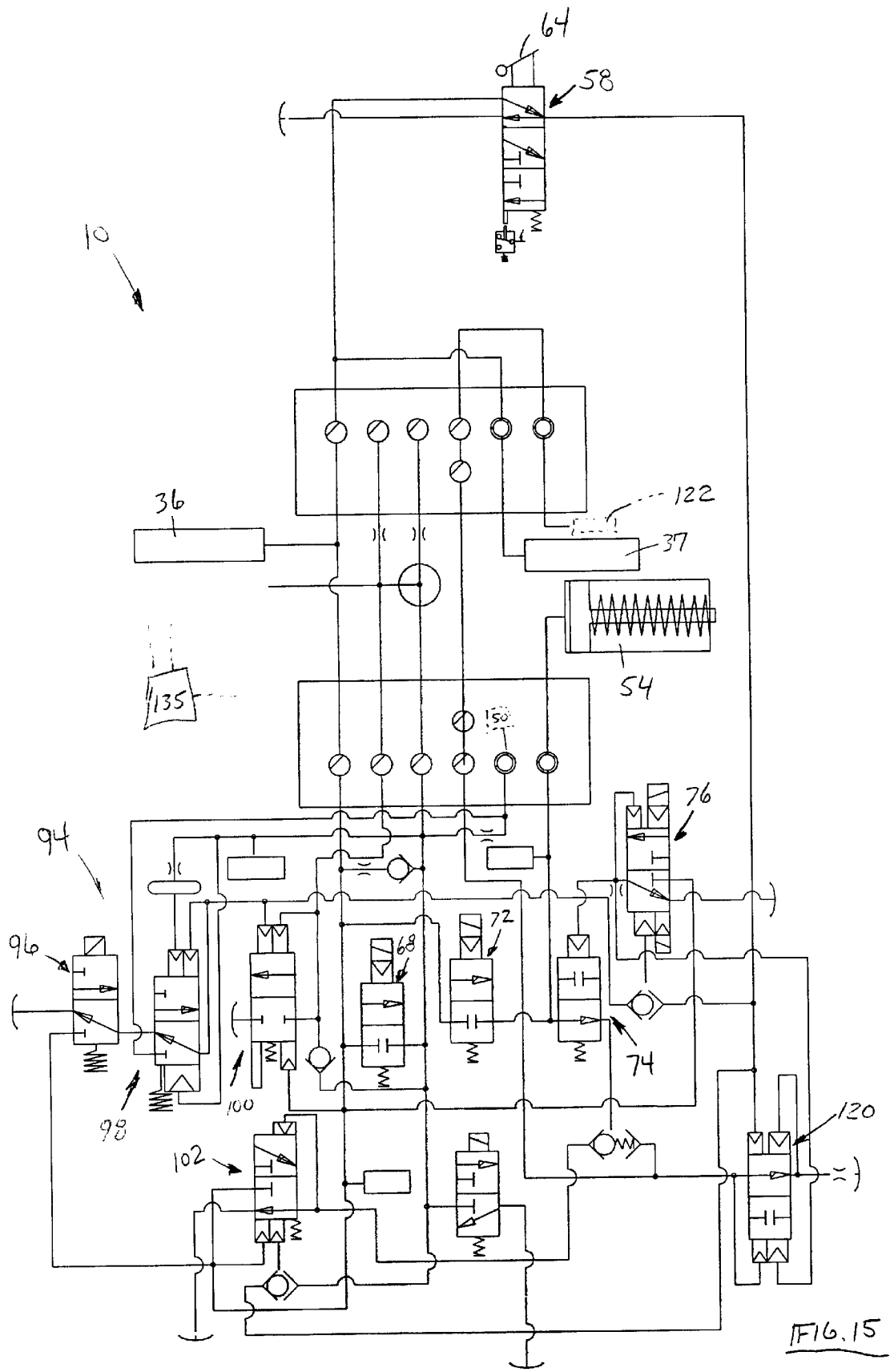
FIG. 15 is a schematic depicting the pneumatic control system of the present invention in a fully exhausted condition.

In FIG. 13, manual vent valve 58 is shifted to the third position shown. The third position couples emergency reservoir 36 and auxiliary reservoir 37 to exhaust through the manual vent valve. For maintenance purposes, it is at times desirable to service a "dead car". A dead car contains no pressures within any lines, storage tanks or accumulators on the car. It should be appreciated that manual vent valve 58 may be shifted to the third position shown in FIG. 14 immediately following an emergency stop. It is not a requisite step to first enter the second position of manual vent valve 58 prior to entering the third position. Accordingly, if it is desirable to produce a dead car and completely evacuate the reservoirs after an emergency stop, an operator preferably actuates lever 64 to index manual vent valve 58 to the third position thereby venting the brake cylinder and the reservoirs to atmosphere through the manual vent valve. FIG. 15 depicts a completely exhausted car which is the result of holding manual vent valve 58 in the third position shown in FIGS. 13 and 14.

While the invention has been described in the specification and illustrated in the drawings with reference to certain preferred embodiments, it will be understood by those skilled in the art that various changes may be made and equivalence may be substituted for elements thereof without departing from the scope of the invention as defined in the claims. For example, those skilled in the art will understand that emergency valve assembly 94 may alternatively be constructed as two or more separate valve assemblies to accomplish the function previously described. Similarly, electrical solenoids may be substituted for fluid pilots and fluid pilots may be substituted for electrical solenoids where feasible. Therefore, it is intended that the invention not be limited to the particular embodiment illustrated by the drawings described in the specification as a best mode presently contemplated for caring out this invention, but that the invention will include any embodiments falling within the foregoing description and the appended claims.

What is claimed is:

1. A pneumatic control system for a freight car having a brake pipe, auxiliary and emergency reservoirs normally charged with pressurized fluid from said brake pipe, a fluid pressure activated brake cylinder device and an exhaust, said pneumatic control system comprising:

an electronic controller at least one pressure sensor, said at least one pressure sensor detecting pressure in said brake pipe and communicating such pressure to said electronic controller;

an electrically operated supply valve controlled by said electronic controller selectively communicating at least said brake cylinder device with one of said reservoirs to perform a brake application;

an exhaust valve selectively communicating said brake cylinder device with the atmosphere thereby performing a brake release function;

an electronically operated exhaust latching valve controlled by said electronic controller to selectively signal said exhaust valve to connect said brake cylinder device to said exhaust; and an electrically and pneumatically controlled emergency valve assembly, said emergency valve assembly operable to selectively connect said brake cylinder device with one of said reservoirs and also selectively couple said brake pipe to said exhaust.

2. The pneumatic control system of claim 1, wherein said emergency valve assembly is pneumatically controlled to couple said brake pipe to said exhaust if a rate of pressure differential greater than a predetermined amount exists between a reservoir and paid brake pipe.

3. The pneumatic control system of claim 2 wherein said emergency valve assembly includes an electrically signaled pilot valve.

4. The pneumatic control system of claim 3 wherein said emergency valve assembly includes a first valve portion mechanically coupled to a second valve portion wherein said first valve portion selectively couples said brake pipe to said exhaust.

5. A pneumatic control system for a vehicle having a brake pipe for selectively supplying pressurized fluid to a reservoir, a brake cylinder and an exhaust, the pneumatic control system comprising:

an electronic controller;

a pressure sensor In communication with said brake pipe, a plurality of valves for selectively directing said pressurized fluid stored within said reservoir to said brake cylinder wherein one of said plurality of valves is an of emergency valve assembly;

said emergency valve assembly being in fluid communication with said brake pipe and electrical communication with said electronic controller whereby said emergency valve assembly may be fluidly or electrically signaled to couple said reservoir to said brake cylinder, wherein said emergency valve assembly may be fluidly or electrically signaled to couple said brake pipe to said exhaust.

6. The pneumatic control system of claim 5 wherein said emergency valve assembly includes a fluidly actuated rate sensing valve, wherein said rate sensing valve determines a rate of change of pressure in said brake pipe.

7. The pneumatic control system of claim 6 wherein said emergency valve assembly includes a first backup valve in communication with said rate sensing valve wherein said rate sensing valve selectively signals said first backup valve to couple said brave pipe to said exhaust.

8. The pneumatic control system of claim 7 wherein said emergency valve assembly includes a second backup valve in communication with said first backup valve wherein said first backup valve selectively signals said second backup valve to couple said reservoir to said brake cylinder.

9. The pneumatic control system of claim 8 wherein a signal returning said first emergency backup valve does not return said second emergency backup valve.

10. The pneumatic control system of claim 8 wherein said first emergency backup valve returns at a different time than said second emergency backup valve.

11. The pneumatic control system of claim 5 further including a manual vent valve far selectively coupling said brake cylinder to said exhaust.

12. The pneumatic control system of claim 5 further including a brake cylinder dump valve and a retainer valve, wherein said retainer valve maintains a predetermined pressure in said brake cylinder and wherein said brake cylinder dump valve selectively couples said brake cylinder to atmosphere to release said predetermined pressure.

13. A braking method for a freight train having a mixture of cars equipped with an electronically controlled pneumatic system and cars without an electronic system, the cars equipped with electronics having a brake pipe, at least one reservoir charged with pressurized fluid from the brake pipe, a fluid pressure operated brake cylinder and an electronic controller for controlling the pressure in said brake cylinder to operate at least one car brake, the braking method comprising:

pneumatically signaling a brake command via said brake pipe;

detecting said pneumatic brake command via a brake pipe pressure sensor which communicates with said electronic controller;

momentarily electrically signaling an exhaust latching valve to move to a first position, said exhaust latching valve in pneumatic communication with an exhaust valve thereby signaling said exhaust valve to close a path from said brake cylinder to atmosphere to allow pressurization of said brake cylinder; and selectively pneumatically or electrically signaling an emergency valve to couple said brake pipe to exhaust and propagate an emergency signal to said cars.

14. The braking method of claim 13 further including the step of selectively latching said exhaust latching valve in said first position by supplying a pneumatic signal thereto.

15. The braking method of claim 14 further including the step of selectively electronically controlling a supply valve to provide brake cylinder pressure.

16. The braking method of claim 14 further including the step of selectively electronically controlling an emergency pilot valve to initiate an emergency stop.

17. The braking method of claim 16 wherein said emergency pilot valve is in pneumatic communication with said emergency valve, and wherein said emergency valve includes a first portion for selectively coupling said brake pipe to atmosphere.

18. The braking method of claim 17 wherein said emergency valve includes a second portion for selectively coupling said reservoir to said brake cylinder.

19. The braking method of claim 18 wherein said second portion of said emergency valve is selectively mechanically coupled to said first portion.

20. The braking method of claim 13 further including the step of actuating a manual vent valve to selectively couple said reservoir to atmosphere.

21. A pneumatic control system for a freight car having a brake pipe, auxiliary and emergency reservoirs normally charged with pressurized fluid from said brake pipe, a fluid pressure activated brake cylinder device and an exhaust, said pneumatic control system comprising:

an electronic controller;

at least one pressure sensor, said at least one pressure sensor detecting pressure in said brake pipe and communicating such pressure to said electronic controller;

an electrically operated supply valve controlled by said electronic controller selectively communicating at least said brake cylinder device with one of said reservoirs to perform a brake application;

an exhaust valve selectively communicating said brake cylinder device with the atmosphere thereby performing a brake release function;

an electronically operated exhaust latching valve controlled by said electronic controller to selectively signal said exhaust valve to connect said brake cylinder device to said exhaust; and an electrically controlled emergency valve assembly, said emergency valve assembly operable to selectively connect said brake cylinder device with one of said reservoirs and also selectively couple an emergency side of said brake pipe to said exhaust.

22. The pneumatic control system of claim 21 wherein said emergency side of said brake pipe provides a substantially greater flow rate of air than a service side.

23. A pneumatic control system for a vehicle having a plurality of interconnected cars, a brake pipe for selectively supplying pressurized fluid to a reservoir, a brake cylinder and an exhaust, the pneumatic control system comprising:

an electronic controller;

a pressure sensor in communication with said brake pipe, a plurality of valves for selectively directing said pressurized fluid stored within said reservoir to said brake cylinder wherein one of said plurality of valves is an emergency valve assembly;

a brake pipe bracket having a service side and an emergency side, said emergency valve assembly being in fluid communication with said emergency side of said brake pipe and electrical communication with said electronic controller, wherein said emergency valve assembly is selectively controlled to couple said brake pipe on said emergency side to said exhaust and propagate an emergency signal down the vehicle to the next set of cars.

24. The pneumatic control system of claim 23 wherein said brake pipe on said emergency side provides a substantially greater maximum flow rate of air than said brake pipe on said service side of said brake pipe bracket.

\* \* \* \* \*